United States Patent
Cakmakci

Patent Number: 5,087,488
Date of Patent: Feb. 11, 1992

[54] METHOD AND APPARATUS FOR FORMING A PLASTIC ARTICLE WITH AN OVERLAY OF VARYING THICKNESS HAVING A SHADED COLOR APPEARANCE

[75] Inventor: Mehmet Y. Cakmakci, Rochester Hills, Mich.

[73] Assignee: Aeroquip Corporation, Maumee, Ohio

[21] Appl. No.: 423,377

[22] Filed: Oct. 19, 1989

[51] Int. Cl.⁵ .................................................. B60R 13/04
[52] U.S. Cl. ................................ 428/31; 264/177.1; 264/177.16; 264/177.2; 264/245; 425/131.1; 425/133.5
[58] Field of Search ............ 264/171, 177.1, 167, 264/177.16, 177.17, 177.19, 177.20, 245-247; 425/131.1, 133.5, 462, 466, 113; 428/31; 49/490, 491

[56] References Cited

U.S. PATENT DOCUMENTS

| | | | |
|---|---|---|---|
| 3,471,898 | 10/1969 | Krystof | 425/131.1 |
| 3,811,989 | 5/1974 | Hearn | 264/177.17 |
| 3,813,199 | 5/1974 | Friesner | 425/462 |
| 3,815,637 | 6/1974 | Carrow | 264/177.16 |
| 3,843,475 | 10/1974 | Kent | 264/177.17 |
| 4,118,166 | 10/1978 | Bartrum | 264/171 |
| 4,368,224 | 1/1983 | Jackson | 264/177.1 |
| 4,446,179 | 5/1984 | Waugh | 428/31 |
| 4,562,023 | 12/1985 | Pabst et al. | 264/171 |
| 4,695,236 | 9/1987 | Predohl et al. | 425/131.1 |
| 4,722,818 | 2/1988 | Zoller | 264/177.1 |
| 4,865,676 | 9/1989 | Kimura et al. | 264/177.1 |
| 4,880,674 | 11/1989 | Shimizu | 264/177.1 |
| 4,940,557 | 7/1990 | Kimura | 264/245 |

FOREIGN PATENT DOCUMENTS

| | | | |
|---|---|---|---|
| 3503200 | 5/1986 | Fed. Rep. of Germany | 425/131.1 |
| 60-92821 | 5/1985 | Japan | 264/177.17 |
| 62-240527 | 10/1987 | Japan | 425/131.1 |
| 2154932 | 9/1985 | United Kingdom | 425/131.1 |

Primary Examiner—Jeffery Thurlow
Attorney, Agent, or Firm—Emch, Schaffer, Schaub & Porcello

[57] ABSTRACT

The present invention relates to a plastic trim strip and a method and apparatus for forming in which there is provided an extrusion body and an overlay layer of varying thickness and varying color intensity.

20 Claims, 9 Drawing Sheets

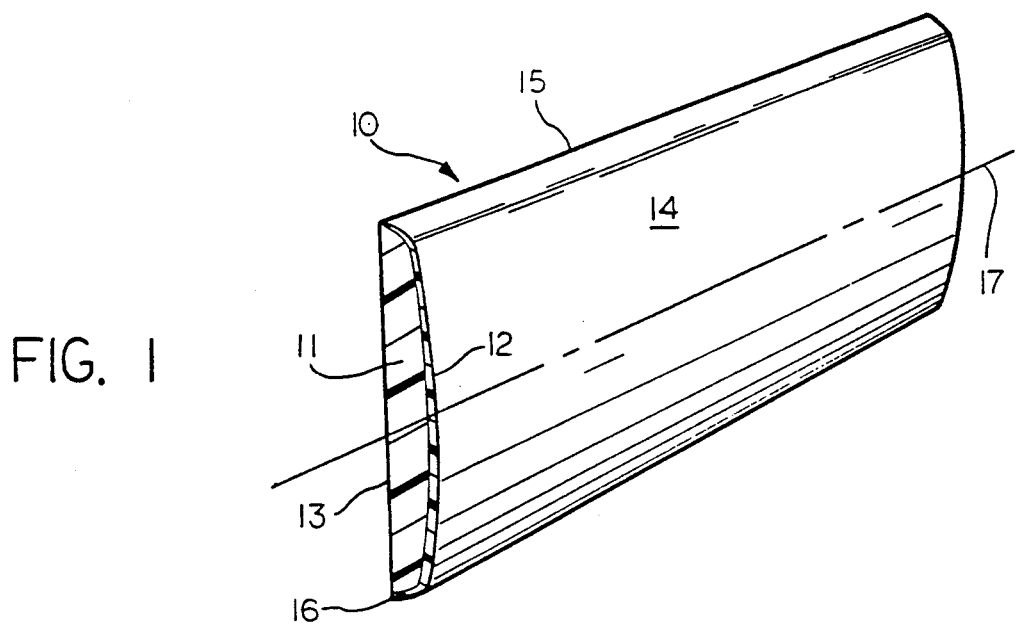
FIG. 1
FIG. 5
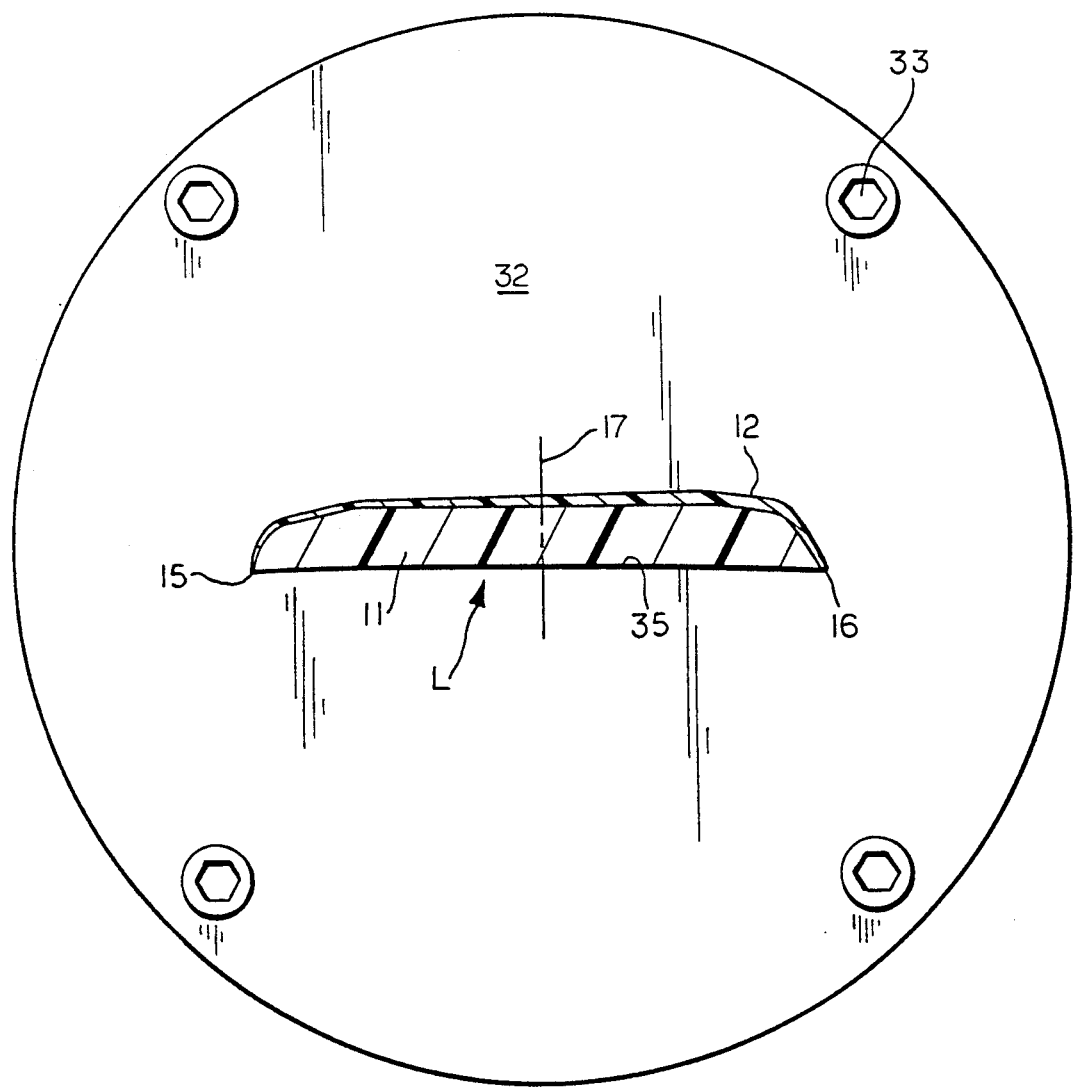

METHOD AND APPARATUS FOR FORMING A PLASTIC ARTICLE WITH AN OVERLAY OF VARYING THICKNESS HAVING A SHADED COLOR APPEARANCE

BACKGROUND OF THE INVENTION

The present invention relates to a method and apparatus for forming a plastic article having multiple layers including an extrusion body and an overlay or top layer having a varying thickness. More specifically, the present invention relates to an automotive trim strip and to a method and apparatus for extruding such trim strip. The trim strip has an extrusion body intended to face toward the vehicle which is formed of relatively inexpensive thermoplastic material and an outer or overlay layer intended to be viewed which is formed of a second and relatively more expensive thermoplastic material, with the outer layer having a color different from that of the extrusion body and a varying thickness to provide a shaded color appearance on the viewing surface.

In the manufacture of plastic automotive trim strips, it is frequently desirable to have an outer layer which is visible for viewing formed of a material having an enhanced aesthetic appearance over that of the material from which the extrusion body is molded. Thus, the extrusion body will frequently be formed of an economical resin such as a polyvinylchloride (PVC) resin or a polyolefin resin while the overlay layer may be formed of a more expensive type of PVC or polyolefin or other thermoplastic with colorants or other additives mixed therein to enhance the appearance or with various types of laminates including metallic foil, lacquers, Mylar ® films or other types of materials. For example, U.S. Pat. No. 4,600,461 discloses a method and apparatus for producing an extruded plastic material having an inner foamed thermoplastic cellular core and an outer non-porous plastic skin extending along at least one side of the core. Under the invention disclosed in that patent, a foamable thermoplastic material is extruded through a first die outlet to produce a foamed thermoplastic material and, thereafter, a film of non-porous thermoplastic material is applied to at least one side of the extruded foamed material. The extruded foamed material with the non-porous film is then fed through a forming die which shapes and seals the materials into the desired cross-sectional shape.

U.S. Pat. No. 4,832,960 discloses a device for feeding an extrusion head for extruding an elongated product of plastic material having a extrusion body of one type or color of plastic and a surface layer of a different type or color of plastic. The device is designed to permit the surface layer to be selectively fed from one of two additional sources of plastic material, each of which may be of a different type or color from the plastic material forming the extrusion body and a different type or color from the other to provide an elongated article having a extrusion body with alternating colors of overlayers.

U.S. Pat. No. 3,471,898 discloses apparatus for extruding a plastic strip from two sources of different colored thermoplastic material to form a unitary strip having a multicolor appearance.

U.S. Pat. No. 4,772,195 discloses a distributing device for the manufacture of multilayer sheets in which superimposed layers of thermoplastic or other materials are simultaneously extruded and united before being introduced into a die. According to that invention, the distribution of the material of each layer on the surface of the adjacent material may be changed by a modification of the relative viscosity of the materials by adjustment of the temperature of the materials introduced. The invention therein disclosed permits a modification of the cross-sectional shape of the stream of one of the thermoplastic materials in the central channel in order to obtain the desired distribution of such material in the sheet at the outlet of the die.

U.S. Pat. No. 4,349,592 discloses a laminated trim strip formed of an extruded thermoplastic elastomer which is laminated to a tie sheet using conventional extrusion laminating techniques. If the extruded elastomer is a polyolefin, the tie sheet, which is itself a laminate, may have a first layer formed of a polyolefin which is compatible with the extruded elastomer and a second layer formed of a dissimilar material such as PVC with the layers of the tie sheet being joined by conventional adhesive. An outer layer may be adhered over the tie sheet.

U.S. Pat. No. 4,446,179 discloses a different type of laminated trim strip having an elongated molding formed from one of a wide variety of materials including PVC with a decorative surface of Mylar and an overcoat of cast plastic.

U.S. Pat. No. 4,533,510 discloses a method and apparatus for continuously co-extruding a sheet having two or more layers in a central portion of the sheet and only a single layer at the edge portions of the sheet. Under the invention therein disclosed, the widths of the center and edge portions may be accurately controlled and varied.

U.S. Pat. No. 4,094,947 discloses a process for co-extruding multiple layers of plastic material in which the thickness of the groups of layers may be varied. Under the process disclosed therein, the die head divides both first and second layers of material into multiple streams.

U.S. Pat. No. 4,128,386 discloses method and apparatus for extruding patterned sheets of differently colored thermoplastic resins which include the step of distributing additional color compositions outside of an extrusion duct of a basic color composition over a number of individual feed channels.

The disclosures contained in such references are hereby incorporated by reference.

SUMMARY OF THE INVENTION

Under the present invention an elongated plastic molding such as a trim strip may be economically produced as an extrusion from a die which is uniquely constructed to provide a varying color intensity to the viewing surface of the extruded strip. The trim strip has an inner extrusion body and an outer decorative layer which has a varying thickness across the width of the strip in a direction transverse to the longitudinal axis of extrusion. Under the present invention a first plasticized thermoplastic material such as PVC is extruded from a first die in a longitudinal direction to form the extrusion body. A second die means is positioned adjacent the first die and is designed to permit the extrustion body exiting from the first die to pass therethrough and to receive an overlay layer of a second plasticized thermoplastic material having a varying thickness. The second die means includes an overlay die having an inlet for receiving plasticized thermoplastic material from a second source and a front die. The overlay die and the front die cooperate to define a chamber communicating with the inlet. The chamber has upper and lower passageways extending transversely to the direction of flow of the extrusion body being extruded from the first die. A restriction dam is positioned within the chamber and functions to restric the flow of thermoplastic material between the upper and lower passageways. However, the restriction dam may be spaced from the front die, thereby providing a gap to permit some flow of such thermoplastic material over the face of the dam and into the lower passageway. The space between the face of the restriction dam and the front die is small and may be uniform or varied depending upon the desired variations in thickness for the overlay material. In addition to the small gap between the face of the restriction dam and the front die, significantly deeper channel means are provided between the upper and lower passageways to permit the flow of thermoplastic material therebetween. As the extrusion body of thermoplastic material passes through the second die means following its extrusion from the first die, it receives an overlay layer of thermoplastic material which has flowed from the inlet to the upper passageway to the lower passageway and directly onto the extrusion body. The combined layers then exit from the front die.

BRIEF DESCRIPTION OF THE DRAWINGS

FIG. 1 is a perspective view of a plastic trim strip formed according to the present invention.

FIG. 5 is a front elevational view taken along line 5—5 of FIG. 3 showing the exit face of the front die of the second die means with thermoplastic material being extruded therefrom.

DETAILED DESCRIPTION OF INVENTION

Figure 2:
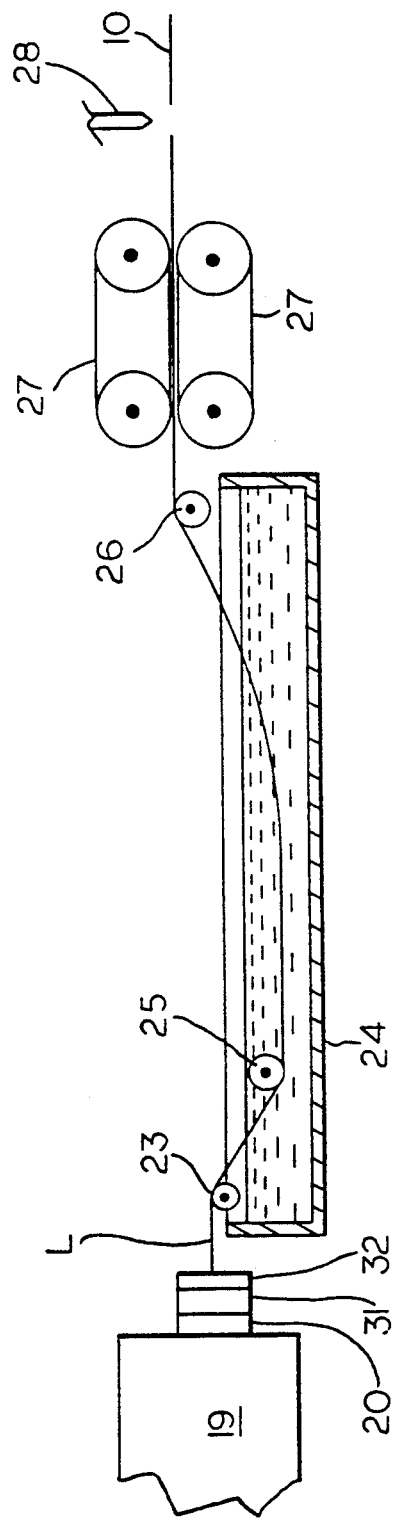
FIG. 2 is a schematic view showing apparatus for forming the plasti trim strip.

Referring now to the drawings, there is shown in FIG. 1 a trim strip 10 formed with an extrusion body 11 of a first thermoplastic material such as polyvinylchloride (PVC) and an overlay layer 12 which is preferably formed of the same type of plastic material as the extrusion body but one which has additives including colorants which will provide such overlay layer with an aesthetic appearance which is more desirable than the appearance of the extrusion body 11. Thus, the extrusion body could be formed of a very economical grade of PVC including PVC which is recycled from scrap of different colors or of a low to medium grade PVC resin. Frequently a black colorant will be added to mask other colors. In contrast the overlay layer 12, which is intended for viewing, will be formed of a more expensive, higher grade of resin, preferably virgin material, to which any one of a wide variety of colorants has been added. The overlay layer 12 may be formed of a different type of plastic material provided it is one which will become permanently bonded to the extrusion body. For example, if the base layer is a polyolefin such as polyethylene, the overlay layer could be formed of a different polyolefin such as polypropylene.

As can be seen in FIG. 1, the trim strip 10 has an inner surface 13 which is intended to face the vehicle to which the trim strip 10 is to be attached and an outer face 14 which is intended to be exposed for viewing when the trim strip 10 is attached to a vehicle. The outer face 14 is the exterior surface of the overlay layer 12 as shown in FIG. 1. The trim strip 10 also has a pair of edges 15 and 16 which are parallel to each other on opposite sides of the longitudinal axis 17 of the trim strip 10.

As can be readily seen in FIG. 1, the overlay layer 12 is significantly thicker in that portion between the longitudinal axis 17 and the edge 16 than it is in the area between the longitudinal axis 17 and the opposite edge 15. As will be appreciated the color intensity of a colored overlay layer will be progressively greater as one views from the thinner to the thicker areas of the overlay layer.

Referring now to FIGS. 2-7, there is shown apparatus for molding the trim strip 10. There is provided a first extruder 19 to which is secured a first die 20 having a passageway 21 terminating at an outlet 22. Heated and plasticized thermoplastic material is fed from the extruder 19 to the first die 20 which forms it into the desired shape conforming to the contour of the passageway 21 and extrudes it as the extrusion body 11 through the outlet 22 into a second die means generally designated by the numeral 30. The second die means 30 includes an overlay die 31 and a front die 32. The front die 32 is secured to the overlay die 31 and the combination is secured to the first die 20 by means of a plurality of bolts 33. Thus, the second die means 30 is in confronting relationship with the first die 20. The overlay die 31 has a passageway 34 which is the same size as and has a contour similar to that of the passageway 21 of the first die. The passageway 34 is aligned with the passageway 21 so that as the extrusion body 11 is extruded through the outlet 22, it passes directly into the passageway 34. The front die 32 also has a passageway 35 extending therethrough and aligned with the passageway 34. As will be appreciated, the passageway 35 will be slightly enlarged from the size of the passageway 34 in order to accommodate the overlay layer 12 which will pass therethrough.

The overlay die 31 includes an inlet passageway 38 for receiving heated and plasticized thermoplastic material from a second source such as an extruder (not shown).

The overlay die 31 has a rear face 36 which is mounted against the face of the first die 20 and a front face 37 against which the front die 32 is secured. The front die 32 has a rear face 39 which is in contact with the front face 37 of the overlay die 31.

Formed in the front face 37 of the overlay die 31 is a cavity or recessed area 40 which cooperates with the rear face 39 of the adjacent front die 32 to define a chamber for receiving plasticized thermoplastic material from the inlet passageway 38. The chamber includes an upper passageway 42 and a lower passageway 43 which have positioned therebetween a dam 44. The dam 44 has a face 45 which, preferably, is spaced a short distance from the rear face 39 of the front die 32. Preferably, the size of the space or gap between the face 45 of the dam and the rear face 39 of the front die is on the order of 0.015 inches. Thus, it will be appreciated that a small amount of thermoplastic material may flow from the upper passageway 42 to the lower passageway 43 by flowing across the face 45 of the dam 44 through such gap.

At opposite ends of the dam 44 are provided a first channel 48 and a second channel 49 which provide the major means for flow of the plasticized thermoplastic material from the upper passageway 42 to the lower passageway 43. Since the flow path from the inlet passageway 38 to the channel 49 is longer than the flow path from the inlet passageway 38 to the first channel 48, the pressure directing the plasticized thermoplastic material to the second channel 49 will be lower than the pressure directing such material to the first channel 48.

Figure 3:
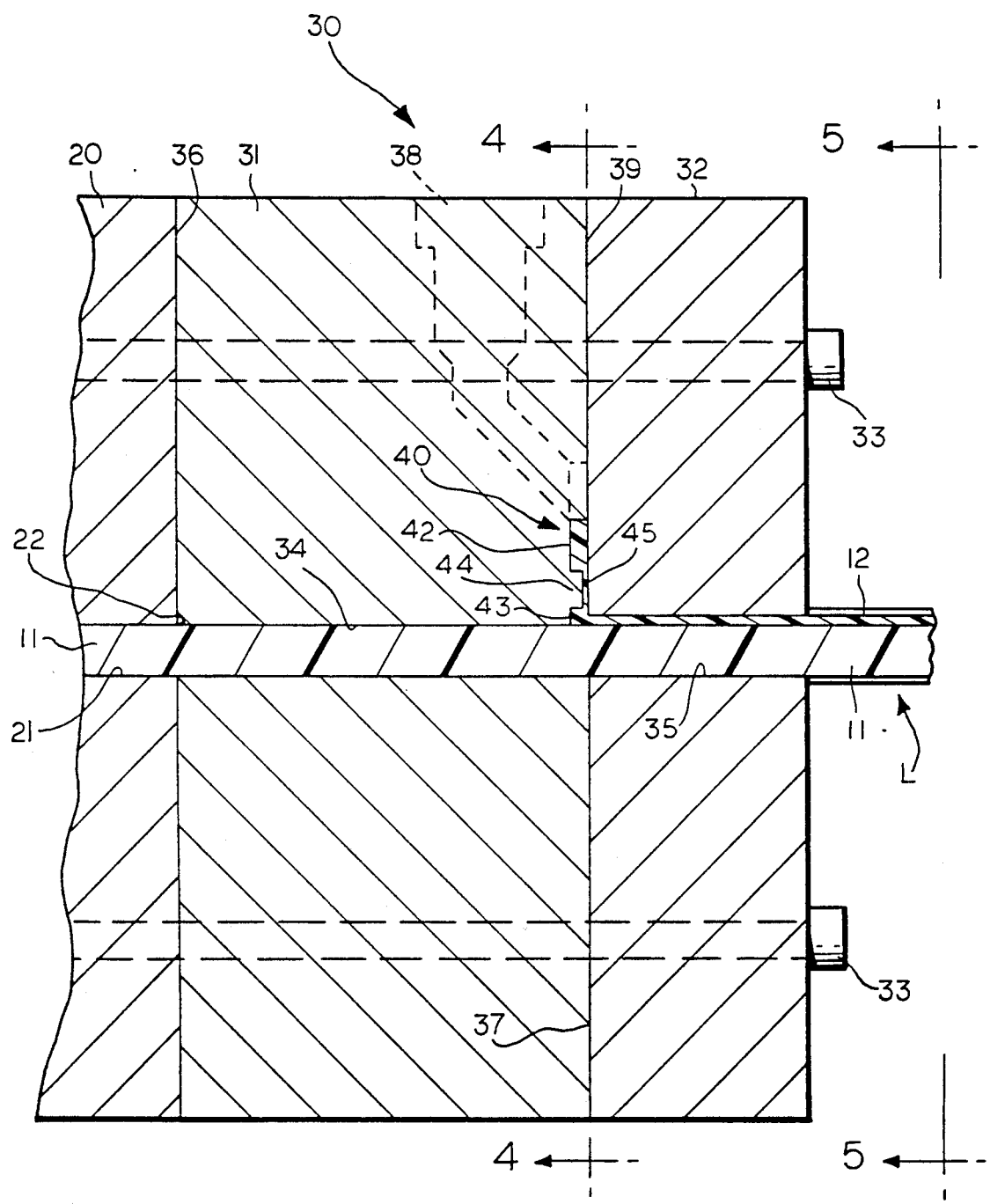
FIG. 3 is an elevational view, in section, showing apparatus of the present invention for extruding a continuous length of thermoplastic material having an extrusion body and an overlay layer of varying thickness transverse to its axis.
Figure 4:
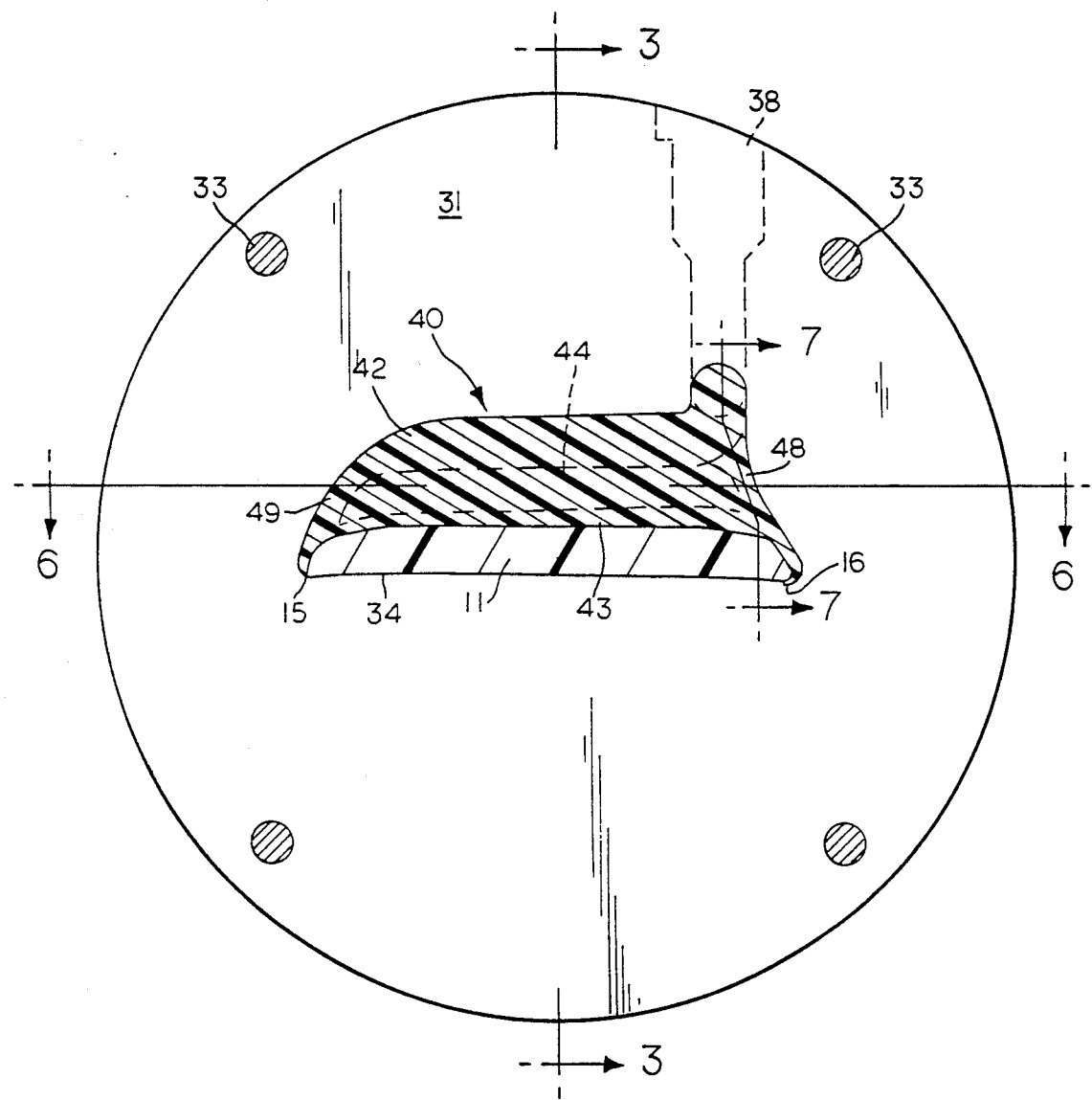
FIG. 4 is a view taken along line 4—4 of FIG. 3 showing the overlay die of the second die means with the front die removed therefrom and with thermoplastic material therein.
Figure 6:
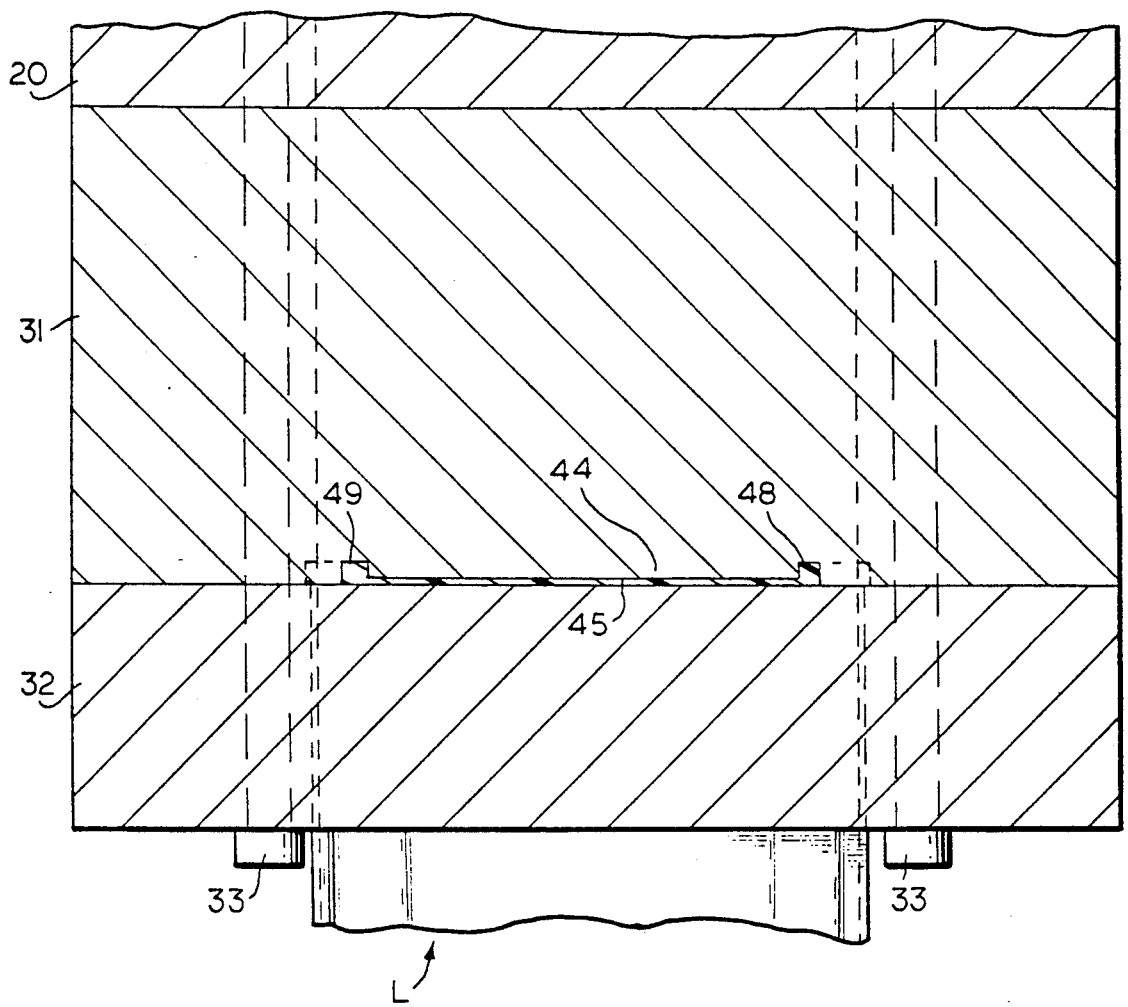
FIG. 6 is a sectional view taken through the second die means and a portion of the first die means along line 6—6 of FIG. 4.
Figure 7:
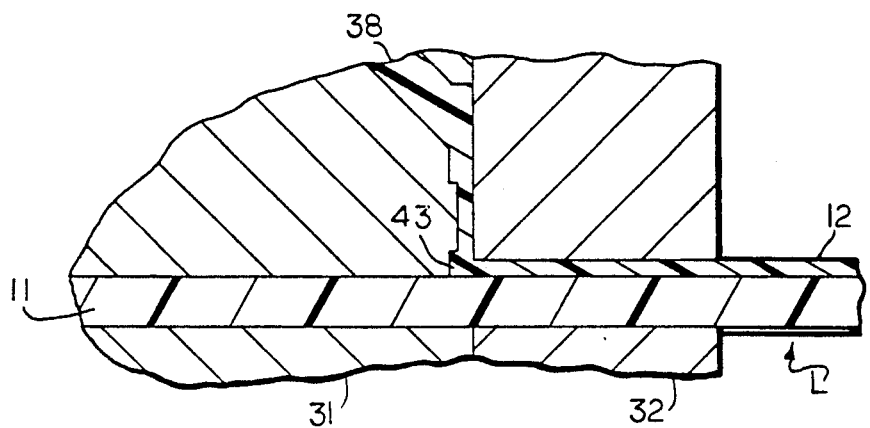
FIG. 7 is a fragmentary sectional view of the overlay die and front die taken along line 7—7 of FIG. 4.

As may be seen particularly from FIGS. 3, 4 and 7, as the extrusion body 11 passes beneath the lower passageway 43, it has deposited thereon heated and plasticized thermoplastic material for forming the overlay layer 12. Although FIG. 3 shows plastic material throughout the chamber from the upper edge of the upper passageway 42 to the lower passageway 43 opening onto the extrusion body 11, there is only a very thin layer of such plastic material in the area in between the front face 45 of the dam 40 and the rear face 39 of the front die and the major amounts of plasticized plastic material are flowing to the lower passageway 43 through the first channel 48 and the second channel 49.

As may be seen from FIG. 2, a continuous length L of thermoplastic material having an extrusion body 11 and overlay layer 12 is extruded from the front die 32. It then passes over a first roller 23 into a water bath 24 where it passes over a second roller 25 and is cooled to a temperature at which the thermoplastic material becomes set. It then passes over a third roller 26 and between a pair of puller belts 27. As is well-known in the art, the puller belts 27 apply tension to the length of extruded material L thereby causing it to draw down to a smaller cross-sectional size. For example, in one manufacturing operation the length of extruded material L as extruded had a width of 2.4 to 2.5 inches but drew down to a width of about 2.0 inches, with nearly all of the draw down occurring between the first roller 23 and the second roller 24. After the length of extruded material L passes through the puller belts 27, it passes beneath a cutter 28 which cuts it to the desired lengths to form the finished trim strips 10.

In forming a trim strip 10 of the type shown in FIG. 1 and having a width between the two edges 15 and 16 of approximately 2 inches, the first channel 48 was formed to have a width of 0.032 inches and a depth as measured to the rear face 39 of 0.032 inches. In contrast, the second channel 49 was formed to have a channel of approximately 0.125 inches in width and with a depth of 0.060 inches. Even though the second channel 49 has a significantly larger area than the first channel 48, it should be noted that the overlay layer 12 is thicker in the portion of the trim strip 10 between the longitudinal axis and the edge 16 than it is between the longitudinal axis and the edge 15. This is due to the fact that the drag placed on the plasticized thermoplastic material in traveling the greater distance from the inlet passageway 38 to the second channel 49 results in a reduced flow of material through that channel than through the smaller first channel 48 which is closer to the inlet passageway 38. It will be appreciated to those skilled in the art that the size and configuration of the channels 48 and 49 may be varied depending upon the relative thicknesses desired between the overlay layer 12 on one side of the trim strip 10 in contrast to that on the other side of the trim strip. The thickness of the overlay layer may also be varied by varying the size of the gap between the face 45 of the dam 44 and the rear face 39 of the front die.

It has been found that the best results are obtained when the extrusion body 11 and overlay layer 12 are formed of the same type of thermoplastic material such as PVC and the extrusion body 11 remains in a heated and softened condition upon reaching the area of the second die means 30 where the heated plasticized thermoplastic material is applied thereto. Assuming both layers are formed of PVC, with the PVC forming the extrusion body 11 having a temperature in the range of 355° F. to 365° F. upon reaching such area of the second die means 30, and with the PVC forming the overlay layer 12 having a temperature in the range of 340° F. to 370° F., the material forming the two layers will flow together so that their molecules become intermingled thereby forming an in situ bond in which the overlay layer 12 becomes permanently joined to the extrusion body 11.

Figure 8:
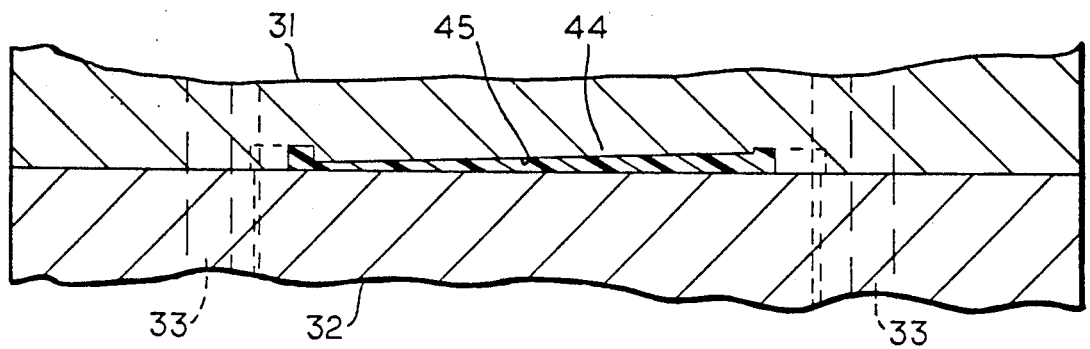
FIG. 8 is a view similar to FIG. 6 showing a modified embodiment in which the restriction dam between the upper and lower passageways confronts the front die at a taper to provide a gap of varying thickness.

FIG. 8 illustrates a modified embodiment in which the face 45 of the dam 44 is angled to provide a tapered gap having a larger space on the right side than on the left side. This will result in the overlay layer 12 being thicker on the portion underlying the right side of the dam 44 than that which underlies the left side.

Figure 9:
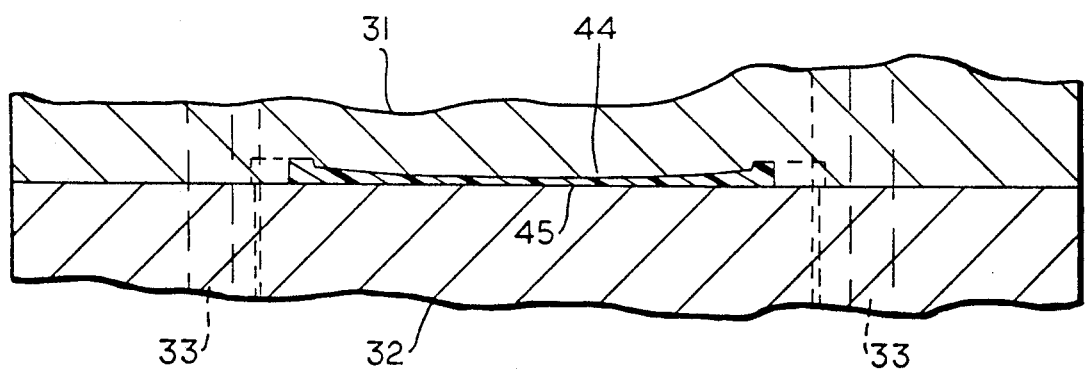
FIG. 9 is a view similar to FIG. 8 showing the restriction dam as having a curved face to provide a gap of varying thickness between it and the front die.

FIG. 9 shows another modification in which the face 45 of the dam 44 has an arcuate configuration. This will result in a trim strip in which the overlay layer 12 will be thinner in the center along the longitudinal axis and thicker on both sides of the longitudinal axis; however, the thickness of the overlay layer 12 on the opposite sides of the axis will not necessarily be precisely the same and they could be significantly different. Thus, as will be appreciated, the factors which determine the thickness of the overlay layer 12 in specific portions throughout the cross section of the trim strip taken transverse to the longitudinal axis will be (1) the size of the first channel 48 in relation to the size of the second channel 49, (2) the distance of the first channel 48 from the inlet passageway 38 in relation to the distance of the second channel 49 from the inlet passageway, (3) the size of the gap between the face 45 of the dam 44, (4) whether such dam is parallel or angled with respect to the rear face 39 of the front die 32 and (5) whether such face 45 is flat or arcuate.

Figure 10:
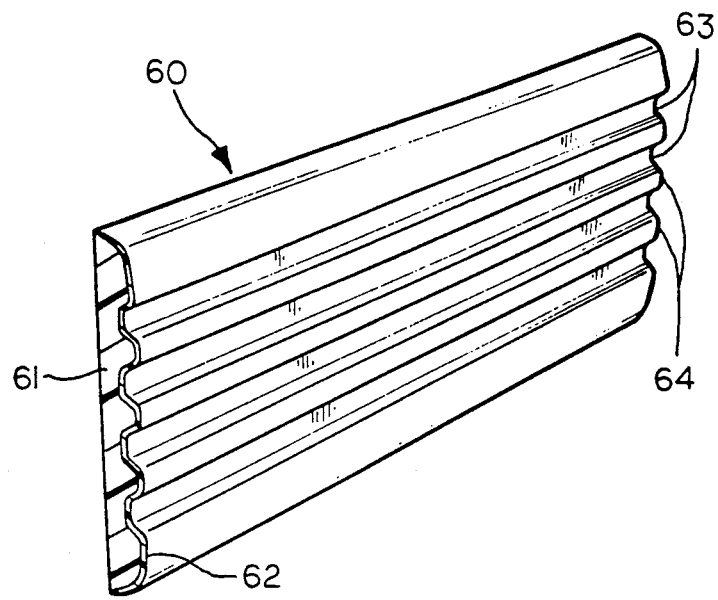
FIG. 10 is a perspective view of a modified trim strip formed according to a modified embodiment.
Figure 13:
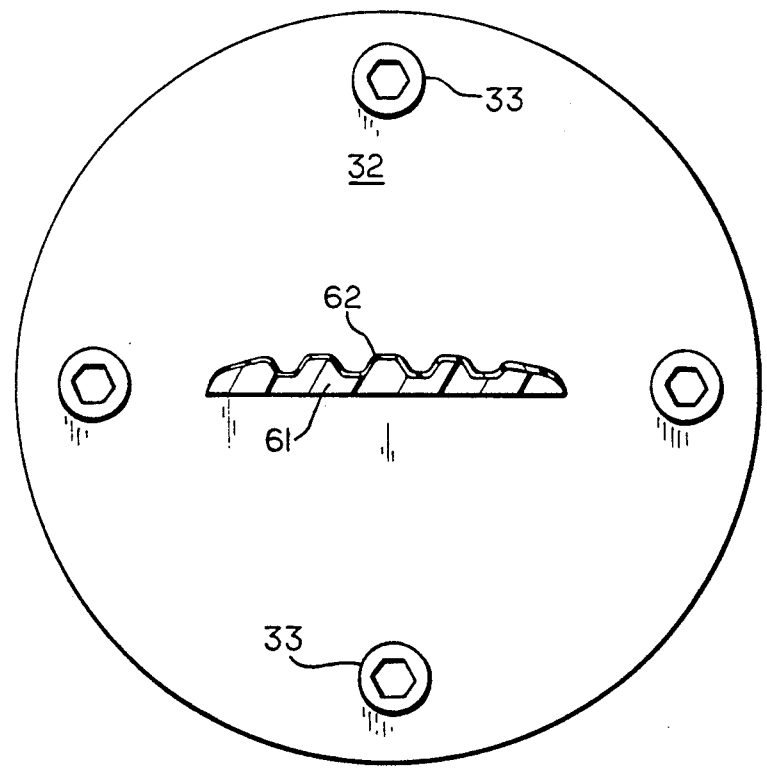
FIG. 13 is a view taken along line 13—13 of FIG. 11.
Figure 11:
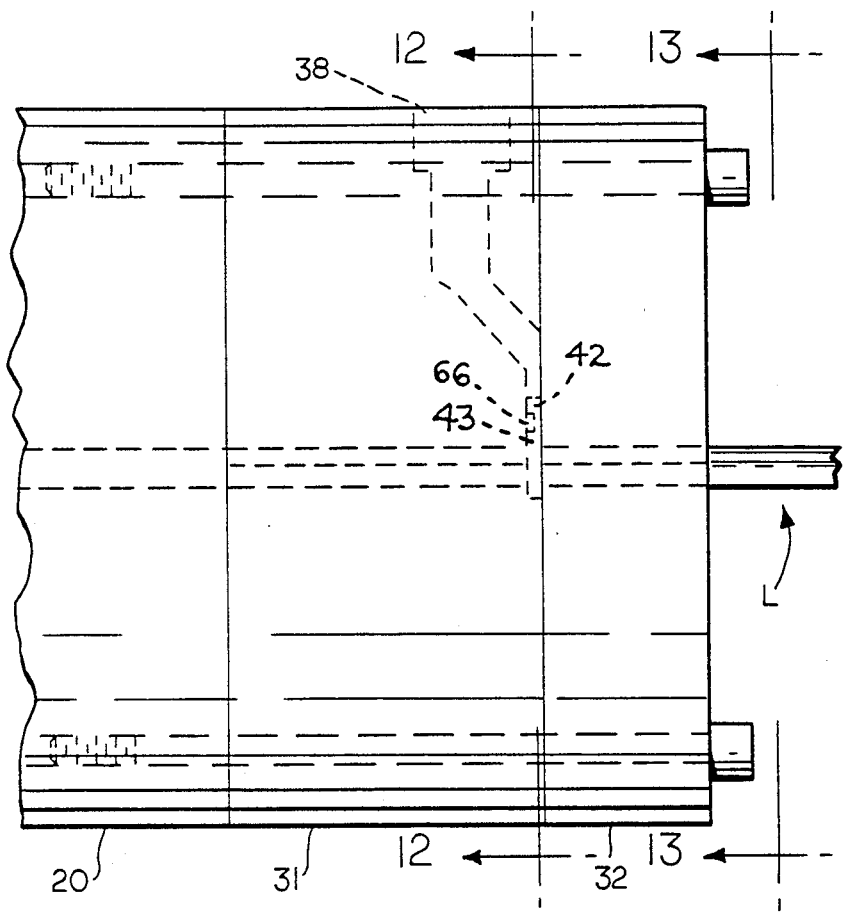
FIG. 11 is a view similar to FIG. 3 showing apparatus for forming a trim strip of the type shown in FIG. 10.
Figure 12:
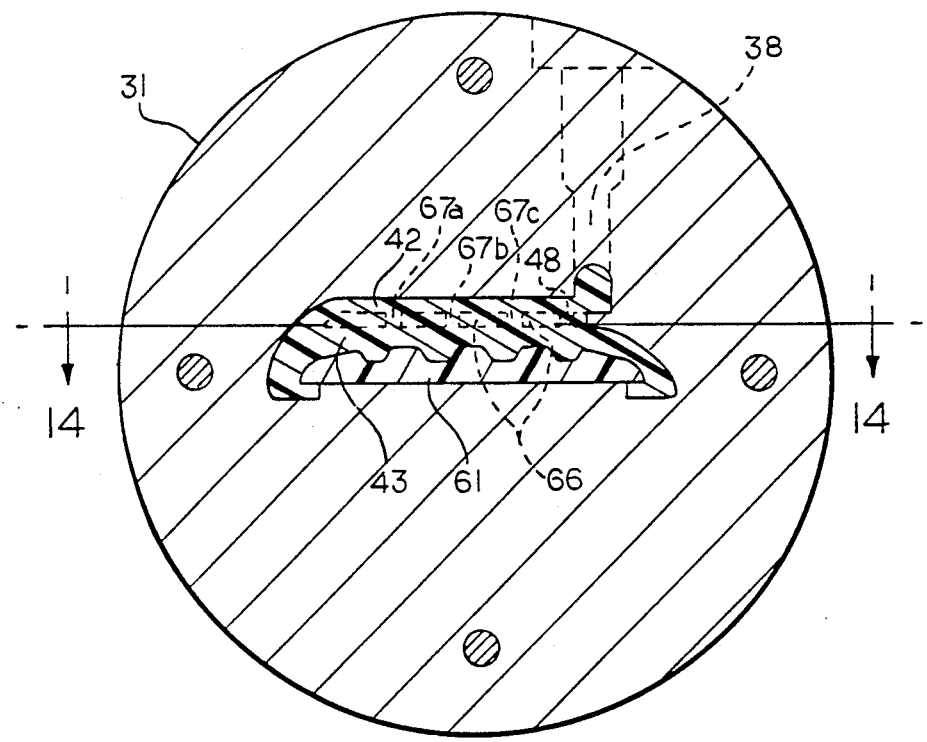
FIG. 12 is a sectional view taken along line 12—12 of FIG. 11.

Referring now to FIGS. 10-14 there is shown a modified embodiment for forming an overlay layer on a extrusion body having a plurality of grooved and raised portions which extend longitudinally. Thus, as shown in FIG. 10, a trim strip 60 has an extrusion body 61 and an overlay layer 62. The extrusion body 61 of the trim strip 60 has been molded to have a plurality of longitudinal grooves 63 separated by a plurality of ridges 64. The grooves 63 and ridges 64 are parallel to the longitudinal axis of the trim strip 60.

As will be obvious to those skilled in the art, the extrusion body 61 may be extruded with the grooves 63 and ridges 64 simply by providing a configuration in the first die to cause the outer face to have such grooves and ridges. Extruding of an extrusion body having a configuration of ridges separated by grooves is not new and does not form part of the present invention. However, in providing an overlay layer 62 for a trim strip 60 in which the extrusion body 61 is provided with grooves 63 and ridges 64, it is desirable to provide apparatus which is specifically tailored to effectively provide an overlay layer 62 for that type of trim strip. The apparatus for providing an overlay layer of varying thickness for this type of trim strip 60 is the same as that utilized in the previous embodiment with one significant exception. In this embodiment, the overlay die 31 is provided with a dam 66 in which are cut a plurality of intermediate channels 67a, 67b and 67c. As can be seen from FIG. 14, the spacing between the respective intermediate channels 67a, 67b, and 67c and the spacing between the first channel 48 and channel 67c and between the second channel 49 and channel 67a is not necessarily uniform but rather is varied depending upon the specific configuration and appearance desired for the finished trim strip 60, taking into consideration, as in the previous embodiment, the effect of reduced pressure resulting from a longer flow path from the inlet passageway 38 to channel 67a than to channel 67b, to channel 67c, which are the intermediate channels and to the end channels 48 and 49.

For example, in forming a trim strip 60 having a nominal width of approximately 2", the extrusion body 61 upon leaving the first die 20 and passing through the overlay die 31 had a width between 2.4 and 2.5 inches. The overlay die used in this embodiment had intermediate channels 67a, 67b and 67c, each having a width of 0.170 inches. The width of the end channel 48 was 0.063 inches. The width of each of the sections of the restriction dam 66 between the respective intermediate channels 67a and 67b, 67b and 67c, and between the intermediate channel 67c and end channel 48 was 0.305 inches. The width of the section of the restriction dam 66 between the end channel 49 and the intermediate channel 67a was 0.375 inches. However, each of the foregoing widths may be varied depending upon the desired distribution in thickness of the overlay layer 62.

As will be appreciated the plasticized thermoplastic material will enter the inlet passageway 38 and travel to the upper passageway 42, through such upper passageway 42 and through the first channel 48, the intermediate channels 67a, 67b and 67c and the second channel 49 and into the lower passageway 43 where the plasticized thermoplastic material is deposited on the extrusion body 61. As previously noted the thickness of the overlay layer 62 in specific areas may be tailored as desired by varying the number, size and spacing of the intermediate channels 67a, 67b and 67c and the sizes of the first channel 48 and second channel 49.

Even though intermediate channels 67a, 67b and 67c are provided, it is still preferred, but not necessary, that the face of the dam between such intermediate channels be spaced from the rear face 39 of the front die 32. Additionally, there may be a greater or lesser number of intermediate channels.

Figure 15:
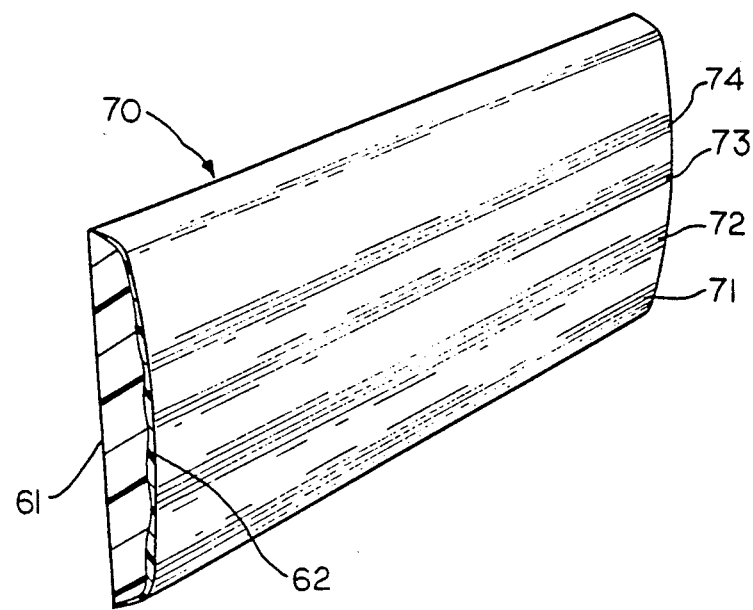
FIG. 15 is a perspective view of a further modified trim strip formed using the second die means of the embodiment of FIGS. 11-14.
Figure 14:
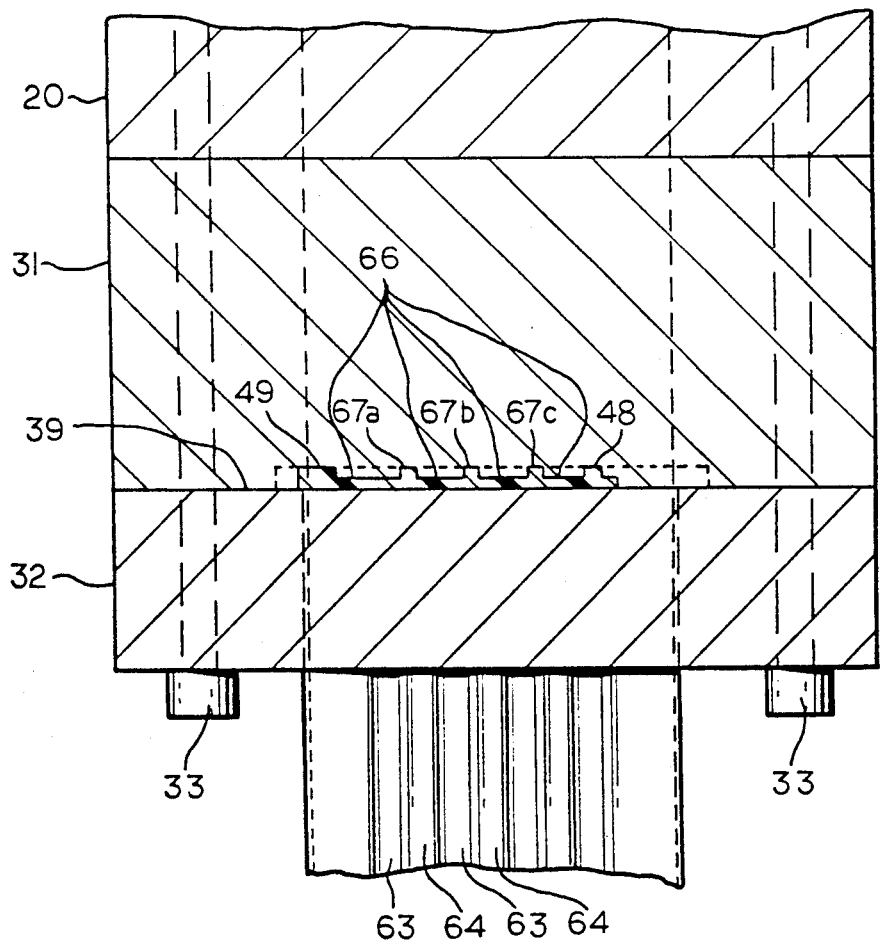
FIG. 14 is a sectional view taken along line 14—14 of FIG. 12.

The utilization of a dam having intermediate channels 67a, 67b and 67c is not limited to providing an overlay layer 62 on an extrusion body 61 having longitudinal grooves 63 and ridges 64. The utilization of a dam 66 having a plurality of intermediate channels such as shown at 67a, 67b and 67c to overlay an extrusion body having a smooth outer face will result in a finished trim strip 70 shown in FIG. 15 which has a plurality of stripes 71, 72, 73 and 74 of different color intensity resulting from the different thickness of the colored overlay layer 62 throughout the width of the finished trim strip 70. Thus, if the extrusion body 61 is black and the overlay layer 62 is red, the black will show through the red overlay in varying degrees to form stripes 71, 72, 73 and 74 while the appearance over the thicker areas between such stripes will be redder or completely red depending upon the thickness in a given area. As can be seen from FIG. 15 the outer surface of the overlay layer 62 may be smooth even though the overlay layer 62 has areas of increased thickness.

The application of the overlay layer 62 in varying thicknesses transverse to direction of movement of the extrusion body 61 coupled with the shaping of the length of material L as it passes through the outlet die 32 reshapes the outer surface of the extrusion body 61 to accommodate the areas of greater thickness of the overlay layer while providing a smooth outer surface to the finished trim strip 70 with stripes of varying color intensity.

The present invention provides trim strips which may be economically formed using apparatus which is simple to construct and yet which provides a finished article having an enhanced aesthetic appearance.

Other modifications will become readily apparent to those skilled in the art. Accordingly, the invention set forth herein is to be limited in scope only by the scope of the following claims.

I claim:

1. Apparatus for forming an elongated article having an extrusion body and an overlay layer of plastic material and a pair of substantially parallel longitudinal edges, said extrusion body having an outer surface extending between said longitudinal edges, said overlay layer covering at least a portion of said outer surface of the extrusion body, said overlay layer having a varying thickness in a plane perpendicular to said longitudinal edges, said apparatus comprising:
  (a) first die means having an inlet for receiving a first plasticized thermoplastic material and an outlet for extruding said material as the extrusion body along a longitudinal axis parallel to said longitudinal edges; and,
  (b) second die means including an overlay die and a front die cooperating therewith, said overlay die having a passage lying on said longitudinal axis and sized to receive said extrusion body from the outlet of the first die means and having an inlet for receiving a second plasticized thermoplastic material from a source different from the source of thermoplastic material for the first die means, said overlay die and said front die cooperating to define a chamber, means directing said second plasticized thermoplastic material from said inlet to said chamber, said chamber having upper and lower passageways extending transverse to the direction of flow of said extrusion body from said first die means, dam means positioned between said upper and lower passageways controlling the flow of said second plasticized thermoplastic material between said upper and lower passageways, channel means extending between said upper and lower passageways for directing said second plasticized thermoplastic material around said dam means, said lower passageway opening directly into the passage through which said extrusion body passes to deposit thereon an overlay layer of said second plasticized thermoplastic material, said front die having an aperture aligned with said passageway and sized to
 (i) receive said extrusion body with said overlay layer deposit thereon; and
 (ii) expell said extrusion body and said overlay layer as a unitary elongated article, said overlay layer having a non-uniform thickness transverse to said direction of flow.

2. Apparatus as defined in claim 1, wherein said channel means extending between said upper and lower passageways are positioned at both ends of said dam means.

3. Apparatus as defined in claim 2, wherein the inlet of said overlay die for receiving said second plasticized thermoplastic material is positioned to provide a shorter flow path to the channel means at one side of said dam means than the channel means at the other side; the channel means at said one side having a smaller cross-sectional size than the channel means at such other side.

4. Apparatus as defined in claim 2, wherein a plurality of intermediate channels extend through said dam means between said upper and lower passageways, said intermediate channels being positioned between said channel means at one side and said channel means at the other side.

5. Apparatus as defined in claims 1, 2 or 3, wherein said dam means is spaced from said front die and cooperates therewith to form a gap through which said second plasticized thermoplastic material may flow from said upper passageway to said lower passageway.

6. Apparatus as defined in claims 1, 2 or 3, wherein said dam means is spaced from said front die and cooperates therewith to form a gap through which said second plasticized thermoplastic material may flow from said upper passageway to said lower passageway, said gap having a varying size transverse to the direction of flow of said extrusion body.

7. Apparatus as defined in claims 1, 2 or 3, wherein said dam means has a curved face spaced from said front die and cooperating therewith to form a gap having varying size transverse to the direction of flow of said extrusion body.

8. Apparatus for applying a thermoplastic overlay layer onto a previously formed article moving in a first direction, said overlay layer in a plane transverse to said first direction having varying thickness, said apparatus comprising die means having
 (i) a first inlet for receiving thermoplastic material in plasticized condition;
 (ii) a second inlet for receiving said previously formed article;
 (iii) an outlet for discharging said previously formed article with said thermoplastic overlay layer applied thereto;
 (iv) an upper passageway communicating with said first inlet;
 (v) a lower passageway communicating with said upper passageway and with the previously formed article passing between said second inlet and said outlet;
 (vi) a restriction dam positioned between said upper and lower passageway; and,
 (vii) means cooperating with said restriction dam to control the flow of said plasticized thermoplastic material at varying rates to selected portions of the lower passageway and onto said previously formed article thereby providing varying thickness for said overlay layer.

9. Apparatus as defined in claim 8, wherein the means cooperating with said restriction dam include first and second channels extending between said upper and lower passageways, the flow path between said first inlet and said first channel being shorter than the flow path between said first inlet and said second channel.

10. Apparatus as defined in claim 9, wherein said first channel has a smaller cross-sectional size than said second channel.

11. Apparatus as defined in claim 9, wherein said restriction dam has a face spaced from said means cooperating therewith to define a gap permitting restricted flow of plasticized thermoplastic material from said upper passageway to said lower passageway across said face and through said gap.

12. Apparatus as defined in claim 10, wherein said restriction dam has a face spaced from said means cooperating therewith to define a gap permitting restricted flow of plasticized thermoplastic material from said upper passageway to said lower passageway.

13. Apparatus as defined in claims 11 or 12, wherein said gap is progressively larger on one side than on the other, in a direction transverse to said first direction.

14. Apparatus as defined in claims 11 or 12, wherein the face of said restriction dam is arcuate in a direction transverse to said first direction.

15. Apparatus as defined in claims 9, 10, 11 or 12 further including a plurality of intermediate channels extending between said upper and lower passageways and positioned between said first and second channels.

16. An elongated automotive trim strip having a decorative viewing surface and having a longitudinal axis comprising (a) an extrusion body of thermoplastic material of a first color having first and second edges on opposite sides of said longitudinal axis, a back surface intended to face toward a panel of a vehicle extending between said edges, a front surface extending between said edges, and (b) an overlay layer of thermoplastic material of a second color extending across at least a portion of said front surface and forming therewith an integral in situ bond in which molecules of the overlay layer are intermingled with molecules of said extrusion body, said overlay layer having substantially uniform thickness in a direction parallel to the longitudinal axis and predetermined varying thickness in a direction transverse to the longitudinal axis including a plurality of thicker areas followed by thinner areas, said overlay layer providing a surface appearance of a plurality of longitudinal strips of varying color intensity.

17. A trim strip as defined in claim 16 wherein said viewing surface follows a smooth contour in a direction transverse to the longitudinal axis.

18. A method of forming an elongated plastic trim strip having a back intended to face a structure and a front intended for viewing comprising the steps of
  (a) extruding heated and plasticized thermoplastic material from a first source through a first die to form an extrusion body of predetermined shape, said extrusion body having a lower surface forming said back, an upper surface and a pair of substantially parallel edges lying on opposite sides of a longitudinal axis,
  (b) introducing said extrusion body into a second die means while said upper surface is at a temperature at which said first source thermoplastic material is soft,
  (c) introducing a second heated and plasticized thermoplastic material from a second source into said second die means,
  (d) directing said second source of thermoplastic material selectively through said second die means and onto said soft upper surface of the extrusion body in varying thicknesses laterally of said longitudinal axis by diverting selected portions of said second source thermoplastic material to follow selected flow paths through said second die means with
    (i) a first of said portions flowing directly from said inlet passageway to the aligned portion of the upper surface of said extrusion body as it passes through said second die means, said first portion providing maximum thickness of said overlay layer,
    (ii) a second of said portions flowing through a longer flow path initially transverse to said longitudinal axis and thereafter downwardly onto other aligned portions of the upper surface of said extrusion body, the resulting overlay layer on said other aligned portions having reduced thicknesses from that of said maximum thickness;
  said second source of thermoplastic material being at a temperature causing its molecules to becomes intermingled with the molecules of the extrusion body, said second source of thermoplastic material forming an overlay layer of varying thickness which is integral with said extrusion body.

19. The method defined in claim 18 wherein some of the second of said portions flows transversely a distance to become substantially aligned with the other of said parallel edges and thereafter flows downwardly onto the aligned portions of the upper surface of said extrusion body and other of the second of said portions flows transversely by varying amounts and then downwardly through a gap of reduced thickness onto other aligned portions of the upper surface of said extrusion body.

20. The method as defined in claims 18, or 19 wherein said second source thermoplastic material is a different color than that of said first source to provide an overlay layer of varying color intensity and shading.

* * * * *